United States Patent [19]

Semsarzadeh

[11] Patent Number: 4,639,396
[45] Date of Patent: Jan. 27, 1987

[54] THERMOPLASTICS-METAL FIBER THREADS

[75] Inventor: Mohammad A. Semsarzadeh, Bethesda, Md.

[73] Assignee: Princeton Polymer Laboratories, Plainsboro, N.J.

[21] Appl. No.: 632,466

[22] Filed: Jul. 19, 1984

[51] Int. Cl.$^4$ .................. B32B 27/18; B32B 31/30; C08K 7/04; H01B 1/06
[52] U.S. Cl. .................. 428/373; 252/503; 252/506; 252/512; 252/514; 252/518; 264/104; 264/126; 264/171; 264/210.8; 428/374; 428/379; 428/401; 428/922
[58] Field of Search ............ 428/373, 374, 372, 364, 428/379, 401, 922; 264/171, 210.8; 252/503, 506, 512, 514, 518

[56] References Cited

U.S. PATENT DOCUMENTS

| | | | |
|---|---|---|---|
| 2,952,291 | 12/1957 | Serniuk et al. | 428/379 |
| 3,928,519 | 12/1975 | Kashiyama et al. | 428/379 |
| 4,302,491 | 12/1981 | Papageorigiou | 428/379 |
| 4,421,582 | 12/1983 | Horsma et al. | 428/36 |

*Primary Examiner*—James C. Cannon
*Attorney, Agent, or Firm*—Cushman, Darby & Cushman

[57] ABSTRACT

An extrusion drawn elongated thread-like filament comprising a minor proportion of elongated metal fibers embedded in a major proportion of thermoplastic polymer wherein the melting temperature of said metal is within the softening to molten range of said polymer and wherein said metal fiber is unidirectional and extends into the elongated length of said polymer.

7 Claims, 2 Drawing Figures

THERMOPLASTICS-METAL FIBER THREADS

Many type of metals in form of fibers or metal coated fibers have been extruded with various types of thermoplastics. Conventional metal fibers used for such purposed have high meltings with respect to thermoplastics. The metal fiber filled thermoplastics suffer from disadvantage, for example, it is not possible to draw them into fine filament threads. In this invention it has been made possible to draw such filaments into such threads.

INVENTION

It has been now found that new thermoplastics metal fibers can be produced by extrusion of metals and metal alloys which have a high coefficient of thermal expansion and melting points or eutectic points lower than the melting points of thermoplastics, drawn into filaments and fibers.

Although a number of pure metals such as mercury, gallium, cesium and rubidium have low melting points and metals such as indium, tin, polonium, bismuth, cadmium, thalium and lead have higher melting points, there are many metal alloys of these metals with higher melting metals that can have useful lower melting points. There are metal and metal alloys that not only have useful melting ranges and points, but also a high coefficient of thermal expansion. Such metal alloys are eutectic compositions of bismuth with other combinations of metals having high coefficient of thermal expansion, low surface tensions when melted and could have melting points ranging from 47° to 551° C. Also binary, ternary, quaternary and quinary alloy compositions or other compositions consisting of bismuth, lead and zinc with one another or with other metals in form of eutectic, peritectic, monotectic or other variations of the above such as synthetic reactions, eutectoid mixtures involving intermediate phases. Terminal solid solutions, eutectic mixtures of two solid solutions and allotropic transformations with high coefficient of thermal expansions and melting ranges from 47° to 650° C. can be used.

This novel process involves extrusion of pure metal or metal alloy powders with thermoplastics into filaments. Such thread-like filaments having metal fibers directed in parallel and unidirectional to the extruded filament axis, so that upon a drawing stretch will result in highly unidirectional long metal fibers extending into the thermoplastic fibers. The strength of these drawn fibers are related to the orientation of the thermoplastic polymer. The properties of thermoplastic metal fibers depend on the morphology of the polymer (ratio of the glass transition temperature to the melting temperature of the polymer), the weight percent of metal in the thermoplastic, the coefficient of thermal expansions of the metal or metal alloy and the thermoplastic, as well as the drawing temperature, ratio, annealing, supercooling and quenching.

The term thermoplastic used herein is a filament fiber forming thermoplastic, thermoelastic or elastomeric polymers. Such polymers are polyethylene (low to high density), polypropylene, polyvinyl chloride, polyvinyl acetate, polyvinyl alcohol, polyvinylidene chloride and flouride, linear polyimides, polyesters, polyurethanes, polycarbonate, fluoropolymers, polyoxadiazole, polythiazidazole, polyamides, liquid crystalline side chain polymers, polybutylene, natural rubber, butyl rubber, ethylene-propylene rubber, styrene-butadiene rubber and acrylonitrile-butadiene rubber.

Selected fillers, fibers, binding agents and additives may also be added before or during extrusion of thermoplastic with lack, high melting metal lers are carbon bpowders, metal oxides, carbonates, sulfates, silicates and various minerals. Fillers may be used without prior treatments or treatments with various binders or release agents. The binding agents include reactive organic polymers, organometallic and surface reactive agents. The additives are various stabilizers, fire retardants, lubricants, textile finishes and colors.

The filament product of this invention can be used for magnetic, paramagnetic, diamagnetic, anisotropy, piezoelectrical, electrical and thermal applications. They can be used as wires and cables in conduction of electricity, in electrodes and catheters. They may also be used as magnetic fibers in recording of electronic signals. They may also be used as semiconducting or superconducting fibers in computers and electronic devices. They may also be used for optical applications and encapsulations of radioactive metals. The filaments may also be used in making porous fibers for diffusion purposes.

Thick filaments can be pelletized for further uses. The filaments can be used in heat sealings, hot dippings, thermoformings, molding and extrusion processes alone or with other thermoplastics and thermosetting resins, into other products such as films, sheets, laminated structures, molded shapes and pipes with desired thermal, electrical and mechanical properties.

The filaments can also be used in surface reactions and graftings, further reactions and crosslinkings with other polymers and thermosetting resins for the reinforcement and frictional purposes.

These filaments can also be used alone or with other fibers or wires in textiles and rubber applications.

Fibers and filaments can be used in applications related to reversible expansion and contraction by utilizing their thermal, mechanical and electrical properties.

EXAMPLE 20 grams of lead-bismuth alloy having a composition of 44.50 by weight of lead and 55.50 percent by weight of bismuth, M.P. of the alloy is 120° C. having a mesh size of 0.40 mm which is mixed with 50 grams of polypropylene pellets (Hercules, Pro-Fax SA-861, melt index=5 and density=0.897 g/cm$^3$) and then is extruded into the shape of filaments by using a single screw extruder equipped with a circular die of 2 mm diameter with a general purpose plasticating single screw.

The extrusion was carried out having a cold feeding zone and three heating zones on the barrel having temperatures of 180°, 180° and 160° C., adaptor temperature of 167° and the die temperature of 215° C. During the operation the head temperature did not exceed 220° C. and the resident time of the thermoplastic and the metal alloy during the extrusion from the feeding zone to the die nozel did not exceed five minutes.

Filaments having twenty eight percent by weight of the metal were drawn by a slow filament winder to yield filaments having a draw ratio of 1.30. In other experiments, filaments having as low as two percent of metal alloy were drawn with a higher filament winding speed to give drawing ratio of 21 or more.

Tensile strengths of these fibers were tested by Instron Model 1125. Filaments having a diameter of 54 mils indicated the initial tensile strength of 12,153 psi and the final tensile strength of 10,461 psi with 781 percent elongation. The crystallized surface of the stretched fibers were examined with Novascan Scan Electron Microscope Model 30 (15 KV accelerating voltage). Nikon optical microscope was used to examine the stretching of metal alloy as extended in the drawn polypropylene metal fiber filament thread.

The elongated filament prepared, for example, can have a diameter between 1.92 and 0.048 mm.

BRIEF DESCRIPTION OF THE DRAWINGS

FIG. 1 shows an extruded thread of polypropylene metal filament. It clearly shows the metal fibers 3 in the resin 4, showing how the elongated metal fibers line up parallel within the thread and follows the resin thread pattern.

FIG. 2 is a drawn thread similar to FIG. 1, but showing how the metal fiber 3 lines up with the resin 4 following the drawn pattern of the thread.

Figure 2:
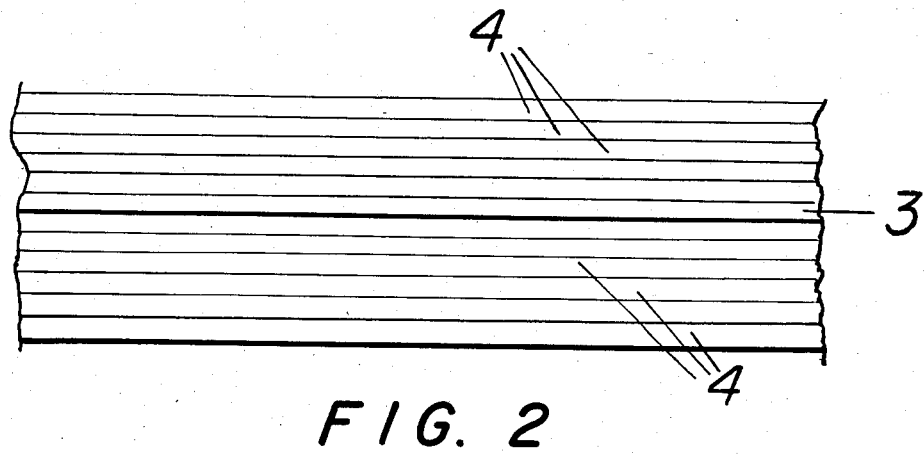
FIG. 2 is a front plan view of a drawn thread like polypropylene metal filament (250×).
Figure 1:
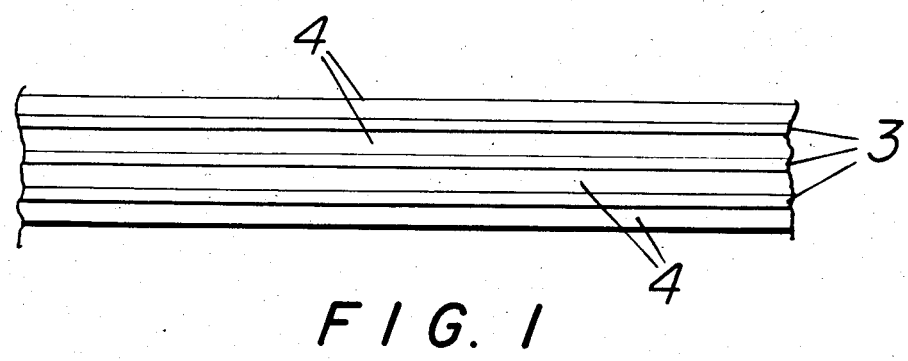
FIG. 1 is a lengthwise side plan view of an extruded thread like polypropylene metal filament (40×).

For the first time it is possible to form a metallic resin thread that results in a product that has many advantageous uses in industry.

What is claimed is:

1. An extrusion drawn oriented elongated filament comprising a minor proportion of elongated metal fiber embedded in a major proportion of thermoplastic polymer by weight wherein the melting temperature of said metal is within the softening to molten range of said polymer and wherein said metal fiber is unidirectional and extends into the elongated length of said polymer, said drawing having been accomplished while the metal is in the molten condition and the extrusion is carried out by simultaneously extruding the metal and polymer.

2. The elongated filament of claim 1 wherein the melting temperature of the metal is from 47° to 551° C., wherein the melting temperature of the polymer is higher than the melting temperature of the metal.

3. The elongated filament of claim 1 wherein the melting temperature of the metal is up to 650° C., wherein the melting temperature of the polymer is higher than the melting temperature of the metal.

4. The elongated filament of claim 1 wherein the proportion of polymer is between 72 to 98 by weight and the proportion of metal is between 2 to 28 by weight based on the total weight of polymer and metal.

5. A filament according to claim 1 having a draw ratio of at least 1.30.

6. A filament according to claim 1 having a draw ratio of 1.30 to 21.

7. The elongated filament of claim 1 wherein the diameter of the filament is between 1.92 to 0.048 mm.

* * * * *